United States Patent [19]

Brewer

[11] 4,018,568
[45] Apr. 19, 1977

[54] FUME ABSORBING-TREATING SYSTEM
[75] Inventor: Gerald L. Brewer, Rowayton, Conn.
[73] Assignee: UOP Inc., Des Plaines, Ill.
[22] Filed: Feb. 9, 1976
[21] Appl. No.: 656,673
[52] U.S. Cl. .......................... 23/288 F; 23/277 C;
 23/262; 210/63 R; 210/152; 210/200;
 55/DIG. 30; 55/160; 55/387; 55/467; 55/210;
 55/212; 200/61.62; 200/61.7; 110/8 A
[51] Int. Cl.² .................... B01J 8/02; F23G 7/06
[58] Field of Search ............ 23/288 F, 277 C, 262;
 210/63, 152, 200, 472, 120; 55/160, 387, 467,
 210–214, 528; 200/66.5, 61.62, 61.7; 110/8 A

[56] References Cited
UNITED STATES PATENTS

| | | | |
|---|---|---|---|
| 154,645 | 9/1874 | Chase | 55/387 |
| 2,208,166 | 7/1940 | Sherron | 200/61.7 X |
| 3,486,841 | 12/1969 | Betz | 23/288 F |
| 3,655,053 | 4/1972 | Hugin | 210/152 |

Primary Examiner—James H. Tayman, Jr.
Attorney, Agent, or Firm—James R. Hoatson, Jr.; Philip T. Liggett; William H. Page, II

[57] ABSTRACT

For purposes of maintaining equipment in enclosures which generate noxious fumes, such as in connection with the handling of sewage in a lift station, there must be adequate venting means to permit entry of workmen into the enclosure without the need of gas masks. In the present integrated system, auxiliary vent capacity is provided through the use of extra fan means and at least one bed of fume absorbent material. This auxiliary fume removal, which can be switched into and out of operation, together with a catalytic or thermal fume treating section, will provide for an arrangement where the absorbent material can be used during temporary periods of venting and then subjected to a reverse out-to-in flow so that desorbed fumes will be treated in the fume incinerator section so that the absorbent material becomes regenerated for reuse at a subsequent time period.

4 Claims, 1 Drawing Figure

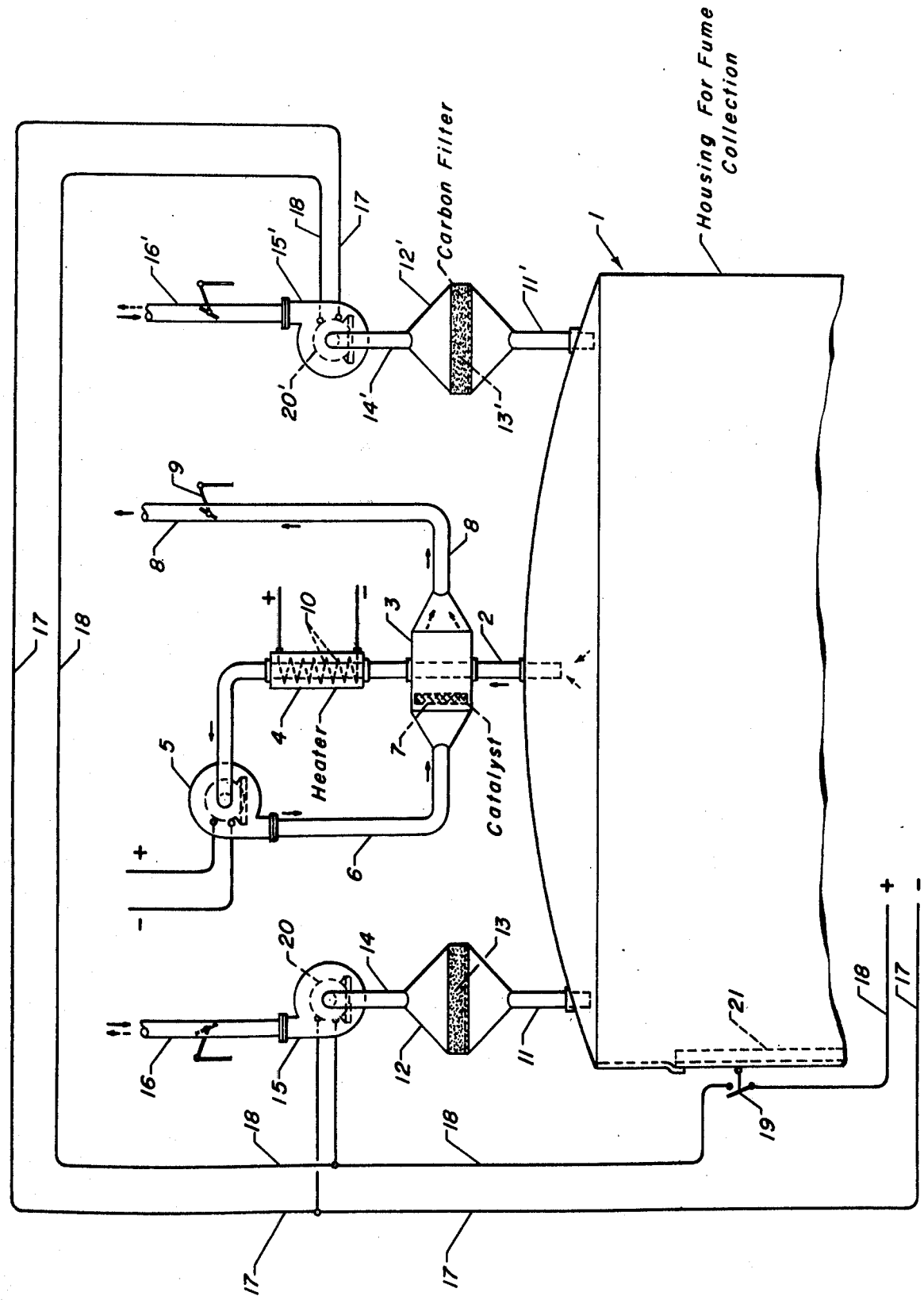

FUME ABSORBING-TREATING SYSTEM

The present invention relates to a fume elimination system which embodies the use of both a fume absorption material and a fume incineration section. Actually, the present system is especially adapted for use with enclosures or chambers which generate or are used to collect and contain noxious fumes and must periodically provide for auxiliary venting and, more specifically, the system is one which combines at least one catalytic or thermal fume treating section, with exhaust fan means that can operate continuously along with one or more fume absorbing sections which will have switch controlled fan means to provide for intermittent venting of the enclosure as may be required. During the "off" periods for the absorption operations, the fan means for the incinerating section will effect an air intake action which in turn provides for an out-to-in flow through the absorbent material and there is a resulting desorption or "regeneration" of the material to permit its reuse as an auxiliary fume eliminator means at a subsequent time period.

BACKGROUND OF THE INVENTION

In connection with certain types of fluid handling equipment or with certain processing operations which handle noxious materials and which necessitate fume venting, it is customary to have fume incinerator means in the venting lines to insure the substantial elimination of noxious fumes and the prevention of undesirable odors reaching neighboring areas. For example, in connection with sewage lift stations, particularly in the warmer southern states, there has been the use of small catalytic fume incinerator units to provide for a continuous treatment of the vented fumes from the enclosures over the lift station tanks and the accompanying pumps. However, at such times as the pumps may require inspection or repair there is the need to have substantially greater ventilation within the enclosure in order to permit workmen to enter and do work without the need of gas masks. As a result there is the need to have auxiliary fans and fume treatment means, unless there is to be pollution of the surrounding area. Additional catalytic or thermal incinerator means can, of course, be provided for this extra service; however, the extra expense of incinerator equipment and the frequent start-up procedures for such equipment can be burdensome.

It is thus an object of the present invention to provide for one or more beds of absorbent material and extra fan means to be used in effecting venting through the fume absorbing material. The motor and fan means need only be operated for those periods of time that workmen are to be in the enclosure or, alternatively, for periods of time where there may be an above normal generation and flow of noxious fumes in the processing chamber.

In an integrated venting system, it can also be an object of the invention to have automatic switch means to initiate the use of the auxiliary fan and the venting of fumes through the absorbent material, as well as automatic means to cut-off the fan operation and permit the fan unit of the incineration section to back-flush air through the absorbent material and effect the regeneration thereof. The switching can be, for example, responsive to the opening and closing of an access door to the enclosure being vented. Optionally, switching could be responsive to fluid levels in a chamber, fluid flow rates into and out of a given chamber, etc.

In one embodiment, the present invention provides a fume elimination and venting system for enclosures generating burnable and absorbable noxious fumes which provides for additional venting for controlled periods of time and will permit safe access to the interior of the enclosure, which comprises in combination: (a) at least one blower operated first venting means from the fume generating enclosure connecting with a fume incinerating means and the subsequent discharge of treated fumes and gases from the system, (b) additional vent means from said enclosure connective with at least one fume absorption section containing a gas pervious absorptive media, (c) auxiliary blower means connective with last said vent means and the absorption section providing for powered operated fume flow outwardly through te absorptive media and the resulting maintenance of a low level of residual noxious fumes within said enclosure for controlled periods of time, and (d) switch control means to cut on and off the auxiliary blower means for the additional vent means and effect the stoppage of the outward flow through the absorptive media and said auxiliary blower means whereby with a continuing venting through said first venting means and the fume incinerating means there is a resulting desorption of fumes from the absorptive media.

The fume incinerating means may be provided to operate thermally with suitable burner means being utilized to generate high temperature flame and gases which will, in turn, be suitable to oxidize the fumes from the collection zone and thus able to discharge less noxious treated fumes from the system. On the other hand, for purposes of economy, the system will typically utilize a gas pervious oxidizing catalyst material which will effect a lower temperature catalytic conversion and treating of the noxious fumes prior to their discharge from the system to the atmosphere. Various types of oxidizing catalysts can be utilized and it is not intended to limit the present system to any one type of catalyst. For example, an all metal catalyst prepared and used in the manner of the teaching of U.S. Pat. Nos. 2,658,742 and 2,720,494 can be particularly suitable. These patents teach the use of gas pervious mats of crinkled high temperature resistant alloy metal ribbons which in turn have been suitably treated or plated to have a highly active catalyst surface of a platinum group metal and, in particular, of a platinum or platinum and palladium. The base materials heretofore used for these types of all metal elements have typically been high nickel content alloys of various types such as Chromel, Nikrothal and Nickrome (which are the tradenames for, respectively, an alloy nickel and chromium, and an alloy of nickel, chromium and iron). The all metal catalyst mats may also be made of base materials which are nickel-free and are essentially of iron, chromium and aluminum. A suitable oxidizing catalyst embodying this type of base material is set forth in U.S. Pat. No. 3,867,313. It may also be noted that the suitable nickel-free ribbon is being presently marketed under the tradenames of Kanthal and Alkrothal, and that such ribbons may be coated with a platinum group metal or combinations of oxidizing metal components in the same manner as the heretofore indicated U.S. Pat. Nos. 2,658,742 and 2,720,494.

Still further, it is within the scope of the present invention to utilize a gas pervious bed of oxidizing catalyst which is of a non-metallic nature such as small spheres, cylinders, or pellets, as for example having an average dimension of the order of 1/16 inch to about ¼ inch, of a refractory inorganic oxide suitably coated with an active oxidizing component. More particularly, the refractory base material may comprise alumina, silica-alumina, silica-alumina-zirconia, silica-thoria, silica-boria, and the like. The oxidizing agent which is utilized to impregnate the refractory inorganic oxide may comprise metals of Groups I, V, VI and VIII of the Periodic Table and, particularly, copper, silica, vanadium, chromia, iron, cobalt, nickel and platinum or palladium with the components being used singly or in combination with one or more active components. Gas pervious "honeycomb" types of refractory support members may also be coated with the aforementioned catalytic agents. The rigid refractory honeycomb supports will typically be made of compositions such as petalite, cordierite, spodumene, sillimanite, magnesium-silicates, alumino-silicates, zirconia, etc.

With regard to the auxiliary venting means to be connected with the fume enclosure and which will be brought into operation when it is desired to handle extra fume generation or necessary to have personnel enter the enclosure without the need of gas masks or other protective measures, it is desirable that there be adequate auxiliary vents to be used in connection with the catalyst or thermal incinerator means. Thus, it may be advisable to have two or more suitably spaced vent means connecting with the enclosure so as to insure suitable fresh air intake into the enclosure and safe working conditions while, at the same time, precluding noxious fumes being vented to the atmosphere. The type of absorbent to be used in connection with the auxiliary vent means will typically comprise gas pervious beds of carbon or activated carbon; however, in certain instances there may be utilized other fume absorbing agents such as alumina, activated alumina, silica gel types of materials, etc. In accordance with the present system, it is also necessary that the additional vent means be provided in a manner that there may be reverse flow therethrough, in other words, downwardly through the auxiliary blower means and an out-to-in flow with respect to the absorption bed such that the latter can be desorbed and, in effect, regenerated after personnel leave the enclosure and auxiliary blower means are turned off. As heretofore noted, the desorbed fumes from the absorption beds of the additional vent means will be drawn downwardly into the enclosure and thence through the catalytic or thermal incinerator means to be purified. Thus each absorption bed is regenerated for reuse at a next controlled period of time.

Reference to the accompanying drawing and the following description thereof will serve to illustrate in a diagrammatic manner how the present system is used to provide safe access to an enclosure which, in turn, is being utilized to collect noxious fumes.

Referring now particularly to the drawing there is indicated the upper portion of a housing enclosure 1 to be used for a fume collection zone. For example, the housing may encompass a sewage lift station where pumps and pits are handling sewage in a lift type of operation. In accordance with the present system, the housing 1 is indicated as having a central fume outlet or vent means 2 which passes in heat exchange relationship with a fume oxidizing zone 3, as well as in a heat exchange relationship with a heating means 10 within a further preheat zone 4. The vent line further connects with blower means 5 which insures the continuous withdrawal of fumes from the interior of housing 1 and the passage of such fumes by way of line or duct 6 into the fume burning zone 3. In this embodiment, there is indicated a gas pervious catalyst bed or mat 7 placed across the latter zone which will be contacted by the flow of the fumes from line 6 and will effect the catalyst incineration of the heated fumes into less noxious treated fumes that can be discharged by way of stack means 8 with control damper means 9.

For the catalytic oxidation of the fumes, there is the necessary preheating of the fumes to the order of 600° to 900° F. by way of heat exchange in chamber 3, as well as within the heater means 4 which, in this instance, shows diagrammatically the use of electrical coil means 10 within enclosure 4 to effect a desirable preheat level to the fumes. As heretofore noted, the catalyst at 7 may comprise an all metal gas previous mat or, alternatively, may comprise coated pellets or porous ceramics such as coated honeycomb elements.

In the present embodiment there is indicated the use of additional vent means at 11 and 11' which, in turn, conduct fumes by way of casings 12 and 12' through fume absorption beds 13 and 13', which typically will comprise one or more thin beds of carbon in order to insure the adequate absorption of the noxious fumes from the withdrawn gas stream. The gases from the housing 12 and 12' are indicated as carrying through lines 14 and 14' to blower means 15 and 15' which, in turn, discharge to the atmosphere through the additional stacks 16 and 16'.

Inasmuch as the additional vent means and the auxiliary blower means at 15 and 15' are used only periodically and for controlled periods of time, there is indicated the use of suitable switch control means to cut on and off the use of the auxiliary blower. Specifically, in the present diagrammatic drawing, there are indicated power supply lines 17 and 18 along with switch means at 19 which control the supply of electric power to a motor means 20 and 20' for the respective blowers 15 and 15'. There is also indicated a connection between switch means 19 and access door means 21 for enclosure 1 such that the opening and closing of the access door 21 will control the switch means 19 and insure that the auxiliary blower means and the additional vent means will be operating during such periods of time as the enclosure door 21 is open and personnel may be entering the enclosure 1. Where desired, the connection between switch means 19 and enclosure door 21 may be such as to insure that the switch is always on during the door-open periods and turned off during such times that the door is closed.

Typically, the blower 5 and fume incineration at oxidizing zone 3 will be maintained in continuous operation as heretofore noted. Thus, the incineration of fumes will take place continuously for the enclosure whether or not personnel are in the enclosure so that, in accordance with the present arrangement, for those periods of time after the auxiliary venting has been shut down with blower means 15 and 15' ceasing operation there is the reverse downward flow of air through stack means 16 and 16' as well as through the absorption beds 13 and 13' to effect their desorption and regeneration for reuse at a next period of time that there may be the need for personnel to enter the closure 1.

It is to be understood that in lieu of a catalyst the oxidizing zone 3 may make use of suitable burner means which will, in turn, generate hot temperature flames and hot combustion gases at a temperature level suitable to effect the thermal burning of the noxious fumes being withdrawn from the enclosure means 1. Also in accordance with teh present system, the thermal incinerating means, like the catalyst system, will typically be operating continuously so that there may be the continuous purification of all fumes leaving the enclosure, including such fumes as are pulled in a reverse flow manner through the additional vent means and from the carbon beds 13 and 13'.

It is to be further understood that the present drawing is diagrammatic and that the positionings of the blowers, absorption beds, heating means and fume incineration sections are all diagrammatic and that they may be positioned and constructed in various conventional manners to effect the desired venting and fume purification functions.

I claim:

1. A fume elimination and venting system for enclosures generating burnable and absorbable noxious fumes which will provide for additional venting for controlled periods of time, which comprises in combination:
   a. at least one blower operated first venting means from the fume generating enclosure connecting with a fume incinerating means to provide for the withdrawal and passage of vented fumes into contact with fume oxidizing means and the subsequent discharge of treated fumes and gases from the system,
   b. additional vent means from said enclosure in interconnection with at least one fume absorption section containing a gas pervious absorptive media and opening to external ambient air,
   c. auxiliary blower means in interconnection with said additional vent means and the absorption section providing for powered operated fume flow outwardly through the absorptive media and the resulting maintenance of a low level of residual noxious fumes within said enclosure for controlled periods of time, and
   d. switch control means to cut on and off the auxiliary blower means for said additional vent means and for effecting the stoppage of the outward flow through the absorptive media and the auxiliary blower means whereby with a continuing venting through said first venting means and fume oxidizing means there is an inward flow of ambient air and a resulting desorption of fumes from the absorptive media.

2. The fume elimination and venting system of claim 1 further characterized in that the fume incinerating means provides gas pervious catalyst means to provide for the catalytic oxidation of the fumes from the first venting means.

3. The fume elimination and venting system of claim 1 further characterized in that said fume incinerating means provides for burner means to effect high temperature thermal incineration of the fumes passing through the first venting means.

4. The fume elimination and venting system of claim 1 further characterized in that said switch control means for the auxiliary blower means and additional vent means is connective with access door means for said enclosure to provide for the operation of said auxiliary blower means when said access door is open and the cutting off of power to said blower means when the door is closed.

* * * * *